United States Patent

[11] 3,594,740

| [72] | Inventors | Joseph H. Comeau<br>Thompsonville;<br>Walter H. Zinn, Glastonbury, both of,<br>Conn. |
|---|---|---|
| [21] | Appl. No. | 659,700 |
| [22] | Filed | Aug. 10, 1967 |
| [45] | Patented | July 20, 1971 |
| [73] | Assignee | Combustion Engineering, Inc.<br>Windsor, Conn. |

[54] POSITION INDICATING APPARATUS
7 Claims, 4 Drawing Figs.

| [52] | U.S. Cl. | 340/188,<br>340/282, 340/285, 340/186 |
|---|---|---|
| [51] | Int. Cl. | G08b 21/00 |
| [50] | Field of Search | 340/188,<br>282, 285, 231 |

[56] References Cited
UNITED STATES PATENTS

| 3,059,107 | 10/1962 | McCool | 340/231 X |
|---|---|---|---|
| 3,217,307 | 11/1965 | Fogelquist | 340/188 |
| 3,412,391 | 11/1968 | Ward | 340/282 |

*Primary Examiner*—Thomas B. Habecker
*Assistant Examiner*—Charles M. Marmelstein
*Attorney*—Fishman & Van Kirk ABSTRACT: Apparatus for providing an indication of the position of a movable member comprising a magnet which moves with the member and a plurality of magnetic flux responsive switches individually positioned along a line parallel to the path of movement of the member. A voltage divider electrically connected to the switches provides a signal commensurate with the position of the member to a position indicating device which includes a second voltage divider, a stepping relay and means to indicate the position of the stepping relay.

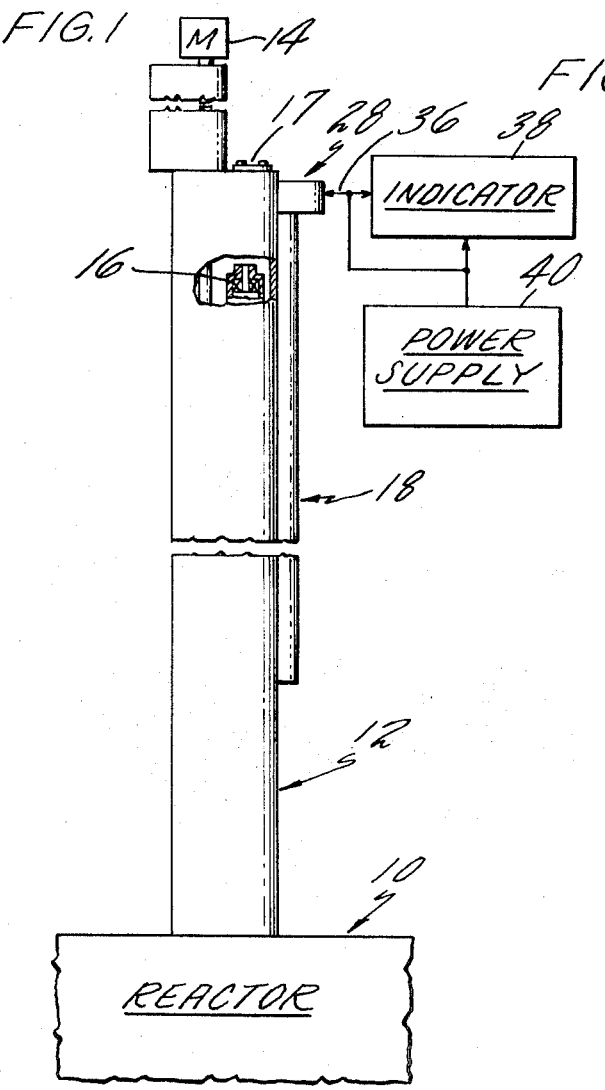
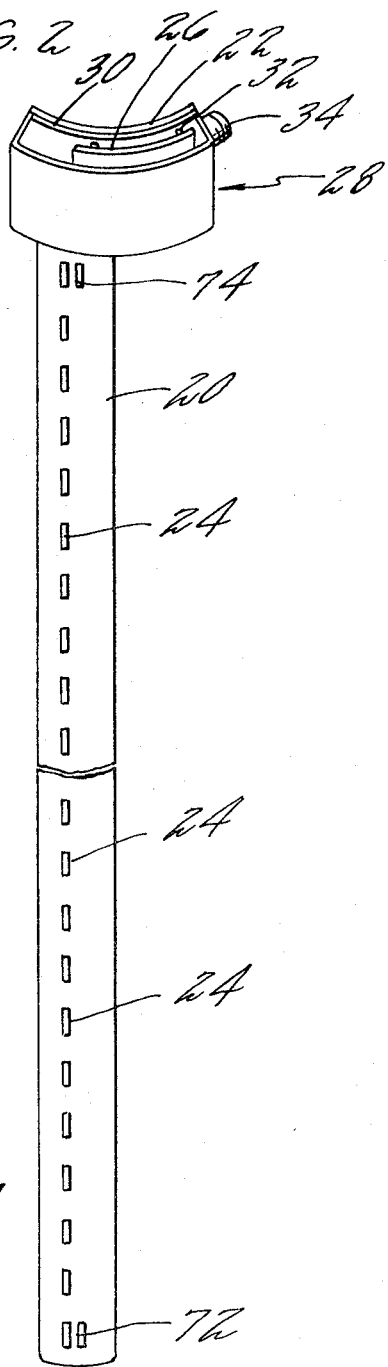
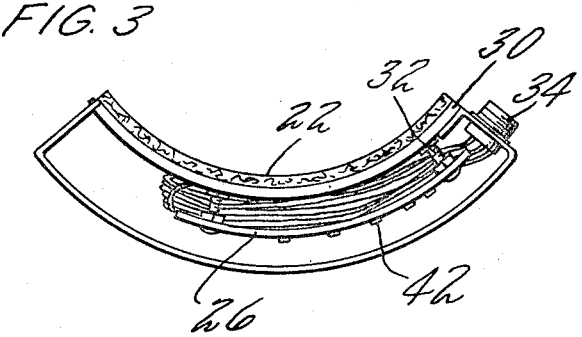
INVENTORS
JOSEPH H. COMEAU
WALTER H. ZINN

POSITION INDICATING APPARATUS

BACKGROUND OF THE INVENTION

1. Field of the Invention

The present invention relates to the providing of an indication of the position of a movable member. More particularly, the present invention is directed to apparatus for indicating the position of a movable member relative to a fixed structure within which the members moves. Accordingly, the general objects of the present invention are to provide new and improved methods and apparatus of such character.

2. Description of the Prior Art

While not limited thereto in its utility, the present invention is particularly well suited to the monitoring of the position of a control rod in a nuclear reactor. As is well known, in the case of a nuclear reactor portions of the structure are normally isolated and sealed off to prevent exposure of operating personnel to dangerous amounts of radiation. Accordingly, the positioning of elements such as the control rods for a reactor must be performed from a remotely located, central control station. Complicating matters is the fact that the control rods themselves must be positioned within sealed housings which extend from the main body of the reactor structure. Obviously, the less communication from the exterior to the interior of the control rod housing the better and thus conventional position indicating apparatus is not suitable for control rod position monitoring. Theoretically, a hermetically sealed control rod drive, including drive motor, is to be preferred and the industry trend is to adopt such drives. However, with the hermetically sealed drive, there is nothing extending out of the control rod housing to provide an indication of where the rod is positioned. Further even with present day practice where the drive motor is positioned external of the control rod housing and communicates with the control rod drive through specially designed drive shaft seals, control rod position cannot be monitored without providing for the passage of a plurality of electrical conductors through the housing so as to provide communication with sensing devices which are mounted on the control rod or its drive structure.

The monitoring of control rod position in a nuclear reactor is further complicated by the fact that the control rod is typically submerged in a fluid and during operation of the reactor the temperature of this fluid and of the rod itself becomes quite high. The design of position monitoring means is thus complicated by the facts that, if portions thereof are to be physically affixed or connected to the control rod as has been past practice, such portions of the position indicating apparatus must be capable of withstanding high temperatures and must be able to operate while submerged in a fluid such as water. These restrictions have previously confined control rod position monitoring equipment designers to working with mechanical or electromechanical components which are suitable for use within the control rod housing. This limiting of flexibility of design has, in turn, required the undesirable communication between the interior and exterior of the control rod housing mentioned above. In addition, in the case of a failure in the monitoring apparatus, repair thereof required a lengthy shutdown of the reactor.

SUMMARY OF THE INVENTION

In accordance with the present invention, means are provided which enable the position of a movable member, such as a nuclear reactor control rod drive, to be accurately monitored without the necessity of providing communication between the interior and exterior of the housing in which the movable member is situated. In addition, in accordance with the present invention all of the components of the position monitoring apparatus are readily accessible and thus repair in the case of a component failure is facilitated. Thus, the present invention overcomes the above-noted disadvantages of the prior art and provides for the monitoring of the position of a movable member which is located within a hermetically sealed housing.

The foregoing and other improvements precipitated by the present invention are provided by apparatus which includes a permanent magnet which is physically positioned on the movable member. The apparatus also includes a plurality of magnetic flux responsible devices which are positioned on the exterior of the housing for the movable member, said devices being positioned along a line parallel to the path of movement of the movable member. As the member moves, the devices are individually energized. A voltage divider or other suitable source of electrical signals is associated with the devices such that a signal commensurate with the position of the movable member will be provided to an indicating apparatus. The indicating apparatus comprises a second source of electrical signals and a stepping relay. The stepping relay operates to balance the signals taken off the two signal sources and the position of the stepping relay is thus an indication of the position of the movable member. Means for providing a visual indication of the position of the stepping relay are also provided. Particularly important features of the present invention are its ability to continue in operation in the case of a failure of one or a limited number of magnetic flux responsible devices and its ease of repair if necessary.

BRIEF DESCRIPTION OF THE DRAWING

The present invention may be better understood and the foregoing and other numerous advantages resulting therefrom will become obvious to those skilled in the art by reference to the accompanying drawing wherein like reference numerals refer to like elements in the various figures and in which:

FIG. 1 depicts the present invention installed on a control rod housing of a nuclear reactor.

FIG. 2 is a perspective view of the portion of the preferred embodiment of FIG. 1 which is mounted on the exterior of the control rod housing.

FIG. 3 is a top view of the apparatus of FIG. 2.

DESCRIPTION OF THE PREFERRED EMBODIMENT

Figure 4:
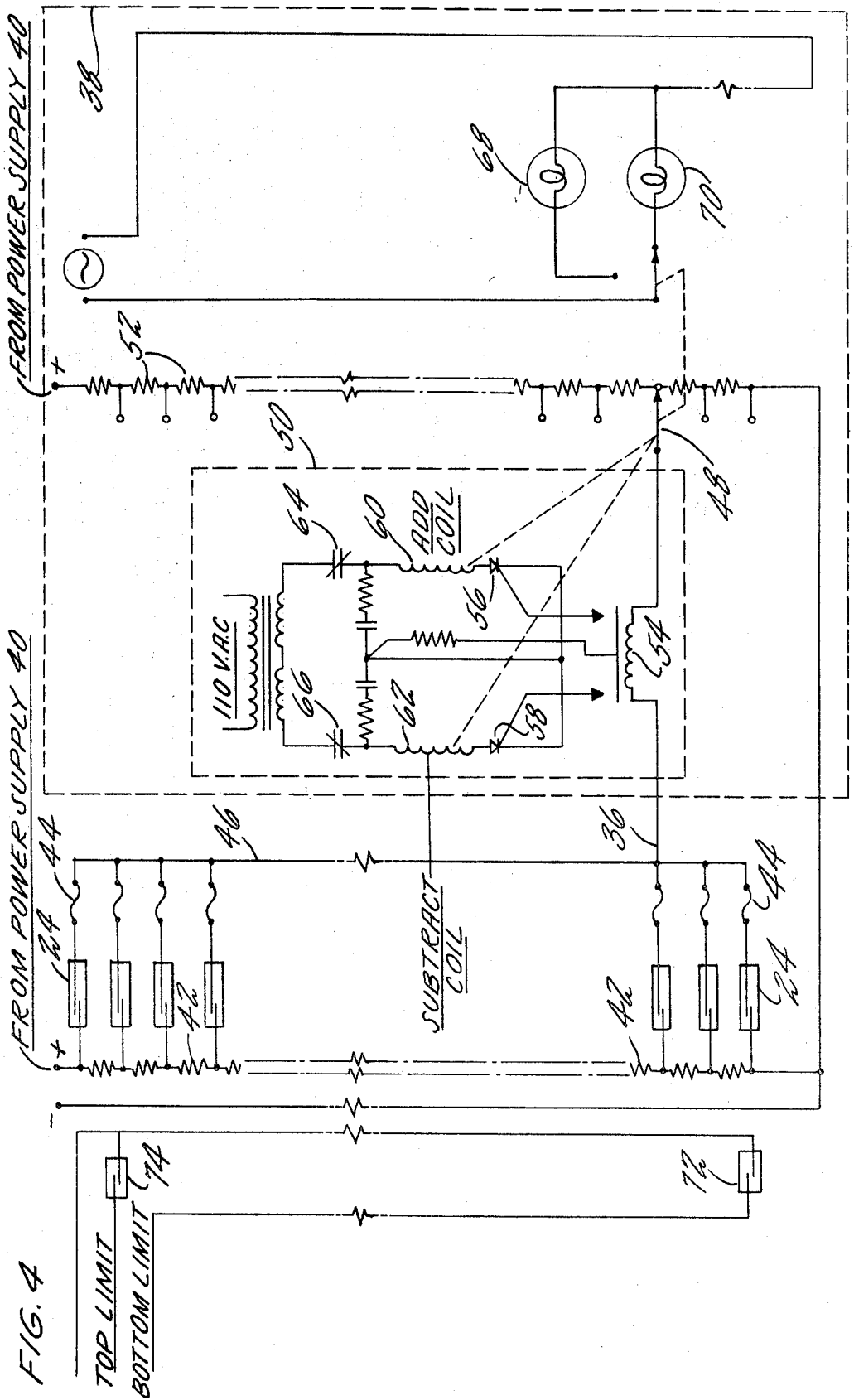
FIG. 4 is a schematic diagram of the electrical circuit of a preferred embodiment of the present invention.

Referring now to FIG. 1, a portion of a nuclear reactor is indicated generally at 10. Extending upwardly from the top of reactor 10 are a plurality of control rod housings, only one of which is shown generally at 12. Control rod housing 12 will typically be a stainless steel tube which is 5 inches in diameter and has a 1-inch thick wall. The control rod drive is situated within housing 12 and the control rod itself extends into the main portion of reactor 10. In the case where reactor 10 is employed for the heating of water in an electrical power generating application, housing 12 will be filled with water and the temperature within housing 12 may reach as high as 500° F.

A control rod drive motor 14 is mounted from and above a cap which seals the upper end of tube 12. Through appropriate gearing, motor 14 causes a control rod drive to move axially of housing 12 thus adjusting the position of the control rod relative to the reactor pile. The drive shaft of motor 14 communicates with the interior of housing 12 through specially designed seals which are available commercially. In the embodiment of FIG. 1, the drive shaft of motor 14 provides the only communication between the interior and exterior of housing 12. This is a distinct improvement over the prior art where, in order to provide for monitoring of the position of the control rod, a plurality of electrical conductors were also passed through the walls of housing 12. It is also to be noted that, in accordance with the present invention, it is possible to employ a submersible-type control rod drive motor and thus motor 14 could be located within housing 12 and the control rod housing hermetically sealed.

A permanent magnet 16 is mounted on the control rod drive inside of housing 12. The operating environment in the example being described requires that magnet 16 be comprised of a material whose magnetic properties are not effected by high temperatures. In addition, the magnet must be sufficiently strong so that its field will penetrate the 1-inch thick stainless steel walls of housing 12. In one installation magnet 16 comprised an Alnico disc. Access to magnet 16 in case replacement becomes necessary is by means of cap 17 which is bolted to housing 12.

The portion of the position indicating apparatus of the present invention which is mounted on the exterior of housing 12 and cooperates with magnet 16 is indicated generally at 18 in FIG. 1. Member 18 comprises an arcuate support 20 (see FIGS. 2 and 3) which is clamped to the exterior of housing 12 by straps, not shown. Support 20 must be comprised of a nonmagnetic material which preferably has a high coefficient of thermal conductivity. Aluminum has been found to have the requisite strength and other necessary characteristics to form a desirable support member. Support 18 is separated from housing 12 by an asbestos lining 22 (see FIG. 3). As may best be seen from FIG. 2, a plurality of switches 24 are suitably affixed to the exposed surface of arcuate aluminum support 20, the switches 24 being aligned in end-to-end relationship. Typically, the switches 24 will be 1 inch in length and will be displaced 3 inches center-to-center. The switches will preferably comprise reed relays which consist of two reeds of magnetic material sealed in opposite ends of a glass tube in such a way that the reeds overlap at center of the tube with a small gap. When subjected to a magnetic flux, the reeds come together thereby closing a circuit. As the control rod drive travels axially of tubular housing 12, switches 24 will be serially and individually closed. The circuitry to be discussed below in the description of FIG. 4 provides an indication of which of switches 24 was last closed and an indication of the position of the control rod within the reactor 10 may thus be obtained.

Electrical contact between each of the two contacts of each of switches 24 and means for generating a signal indicative of which switch is closed is provided by Teflon insulated conductors which extend between the switches and a circuit mounted on Teflon board 26. Circuit board 26 is mounted in a protective structure shown generally at 28. Structure 28 is mounted at the upper end of arcuate aluminum support 20 and, like support 20, is arcuate in shape, fabricated from aluminum or other material having good heat transfer characteristics and is separated from housing 12 by means of asbestos layer 22. Additional protection against thermal damage to the components mounted on circuit board 26 is provided by mounting the circuit board from the inner side 30 of structure 28 by means of a plurality of standoff insulators or posts such as shown at 32 (FIGS. 2 and 3). The components to be mounted on circuit board 26 comprise a plurality of resistors which form a first voltage divider and a plurality of fuses. These resistors and fuses, which are shown schematically in FIG. 4, are mounted from the outer side of circuit board 26 as shown in FIG. 3. It is especially noteworthy that all of the resistors associated with switches 24 are located in the same temperature environment. Errors due to temperature induced changes in resistance are thus eliminated.

Power is provided to the circuit mounted on board 26 and signals indicative of the closing of switches 24 are delivered from the circuit by means of a cable which is attached to cable connector 34. The cable is shown schematically in FIG. 1 at 36 as providing electrical communication between circuit board 26 and an indicator circuit 38 and a power supply 40.

Referring now to FIG. 4, the electrical portions of the present invention are shown schematically. A plurality of resistors 42 of the same size and type are connected in series across the power supply 40, not shown in FIG. 4, to form a first voltage divider. Connected in series with each of reed switches 24 is a fuse 44. Each of reed switches 24 is connected to a different point or tap on the voltage divider comprising resistors 42. All of the circuits comprising the series connected switches and fuses are connected to a signal bus bar 46. Thus, upon the closing of one of switches 24, a signal from the voltage divider comprising resistors 42 will be applied to bus bar 46. The magnitude of this applied signal is indicative of which of switches 24 is at that instant subject to the field from magnet 16.

The signal appearing on bus bar 46 is transmitted to the position indicating device 38 by cable 36. The position indicating device includes a stepping switch 48 and a microposition relay, indicated generally at 50. Microposition relay 50 may be a Barber-Colman Model AY 1Z positioner. This arrangement is effective to step switch 48 along a second voltage divider comprised of a plurality of resistors 52. As with resistors 42 which comprise the first voltage divider, the resistors which comprise the second voltage divider are of equal size and are connected in series across the power supply.

Any unbalance between the voltage appearing on signal bus 46 and that on the movable contact of stepping switch 48 will cause current to flow through a sensing coil 54 in the microposition relay 50. The direction of current flow through coil 54 is dependent upon the direction of the unbalance. Current flow through the sensing coil 54 causes either the add or subtract contacts of the microposition relay to be closed. Depending upon which set of contacts are closed, either an "add" silicon controlled rectifier (SCR) 56 or a "subtract" SCR 58 will be biased "on" permitting current to flow through either "add" coil 60 or "subtract" coil 62. The direction of movement of the arm of stepping switch 48 relative to the voltage divider comprising resistors 52 is determined by which of coils 60 and 62 has current flowing therethrough. An interrupter 64 is connected in series with "add" coil 60 and an interrupter 66 is connected in series with "subtract" coil 62. In interest of clarity, the mechanical actuating means for interrupters 64 and 66 have not been shown in FIG. 4. However, the interrupters are mechanically connected to the movable arm of stepping switch 48 and, depending upon the direction of motion of the movable arm, the interrupter in series with the coil through which current is flowing is momentarily opened each time stepping switch 48 is moved one position in either the add or subtract direction. The momentary opening of the interrupters causes the conductive one of SCR's 56 and 58 to be extinguished and thus the travel of switch 48 along the voltage divider comprising resistors 52 is done in stepwise fashion with the voltage unbalance between the two voltage dividers being sensed after each step. The above-described stepping action results in the indicator "remembering" which of switches 24 was last closed in case the control rod drive is stopped with the magnet 16 located between a pair of switches 24 where its field will not cause closing of either switch.

The movable arm of stepping relay 48 may be ganged to a visual indicator which comprises a plurality of parallel connected lamps, only two of which 68 and 70 are shown. A current path through one of the lamps will be established for each position of the arm of stepping relay 48 and thus a visual indication of the position of the stepping relay will be presented. This visual indication is, of course, commensurate with which of switches 24 was last closed since the stepping relay will be positioned to balance the voltage tapped off the voltage divider comprising resistors 52 and the signal appearing on bus 46. Alternatively, rather than employing ganged moving contacts as shown in FIG. 4, stepping relay 48 may employ a second set of contacts which are closed by the movable arm and these additional contacts will complete the circuits through the parallel connected indicator lamps In a preferred embodiment of the present invention, a second reed switch was physically mounted adjacent to the upper and lower of reed switches 24. These second or parallel mounted switches, indicated at 72 and 74 on FIG. 4, function as lower and upper limit switches for the control rod drive. Thus, when the control rod reaches either of its limits of longitudinal motion, one of switches 72 and 74 will be closed by the field established by magnet 16. The closing of one of switches 72 and 74 will permit current flow to appropriate circuitry, not shown, for disabling or reversing drive motor 14 and energizing a visual or audible alarm.

Because of the operating environment, it may be discovered that certain of switches 24 are more susceptible to failure in service than are others. If this should prove to be the case, second switches may be connected in parallel with those switches which are subject to failure. In a preferred embodiment, the redundancy provided by such parallel connected switches has been employed at the upper and lower extremes of control rod drive. For example, in one embodiment, four reed relays were physically positioned in parallel at the upper and lower ends of support 20 are provided for redundancy in both the upper and lower limit switches and the connections to the opposite ends of the voltage divider comprising resistors 42.

The fuses 44 which are connected in series with each of reed switches 24 permit continued operation of the system even though the contacts of one of switches 24 should stick. In addition, fuses 44 provide a ready indication of the switch which has failed in the case of stuck contacts. In operation, should the operator notice an abnormality in his position indicator, which abnormality will be evidenced by no change on the indicator during a limited movement of the control rod, he may momentarily increase the power supplied to the voltage divider comprising resistors 42. This increase in the applied power will cause the blowing of the fuse in series with a reed switch having stuck contacts if switch failure is the trouble source. Use of the position indicator of the present invention may then be resumed with the operator noting that one position is disabled. The loss of an indication by such a deliberate disabling of one position can be tolerated since the sensing of control rod drive will be lost only in a region of approximately 6 inches along a total path of motion which may be as great as 12 feet. However, should repair be desired, circuit board 26 may be checked to see which of fuses 44 has blown and the switch which is in series with that fuse will thus be identified and may be readily replaced.

While a preferred embodiment has been shown and described, various modifications and substitutions may be made thereto without departing from the spirit and scope of the present invention. Accordingly, it is to be understood that the present invention has been described by way of illustration and not limitation.

What we claim is:

1. Apparatus for indicating the position of a movable member, said movable member being separated from at least part of the indicating apparatus by a partition of nonmagnetic material, said indicating apparatus comprising:
   a permanent magnet, said magnet being affixed to and moving with said movable member;
   a plurality of normally open magnetic flux responsive electrical switches, said flux responsive switches being located on the opposite sides of said partition from said movable member, said flux responsive switches being positioned along a line parallel to the path of motion of said movable member whereby said flux responsive devices will be serially and individually closed during during travel of said magnet with said movable member;
   means for generating a first plurality of voltages of different magnitude;
   means for applying said first plurality of output voltages to the first terminals of individual of said flux responsive switches;
   means interconnecting the second terminals of said flux responsive switches, the magnitude of the voltage appearing on said interconnecting means being indicative of the energization of a particular one of said flux responsive switches;
   a source of reference potential, the magnitude of the output signal from said reference potential source being adjustable;
   means connected to said adjustable reference potential source and said interconnecting means for comparing the signal from said reference potential source with the signal indicative of which of said flux responsive switches is energized;
   means responsive to the sensing of an unbalance by said comparing means for automatically adjusting the output of said reference potential source in stepwise fashion to null said unbalance; and
   means for providing an indication commensurate with the adjusted output of said reference potential source.

2. The apparatus of claim 1 wherein said means for providing an indication commensurate with the adjusted output of said reference potential source comprises:
   a plurality of indicator lamps; and
   means operatively connected to said reference potential source adjusting means for completing an electrical circuit through said lamps individually.

3. The apparatus of claim 2 wherein said means for generating a plurality of output voltages comprises:
   a voltage divider including a plurality of resistors.

4. The apparatus of claim 3 further comprising:
   means for mounting said plurality of resistors in proximity to said flux responsive switches, all of said resistors being in the same temperature environment.

5. The apparatus of claim 1 further comprising:
   means for individually disabling said flux responsive devices.

6. The apparatus of claim 1 further comprising:
   a plurality of fuses, each of said fuses being connected in series with one of said flux responsive switches.

7. The apparatus of claim 4 further comprising:
   a plurality of fuses, each of said fuses being connected in series with one of said flux responsive switches.